(12) United States Patent
van den Oetelaar et al.

(10) Patent No.: US 8,804,472 B2
(45) Date of Patent: Aug. 12, 2014

(54) METHOD AND DEVICE TO IMPROVE START-UP PERFORMANCE OF A MULTI-LAYER OPTICAL DISC

(71) Applicant: Koninklijke Philips Electronics N.V., Eindhoven (NL)

(72) Inventors: Ronald A. J. van den Oetelaar, Den Dungen (NL); Donato Pasquariello, Vasteras (SE)

(73) Assignee: Koninklijke Philips N.V., Eindhoven (NL)

( * ) Notice: Subject to any disclaimer, the term of this patent is extended or adjusted under 35 U.S.C. 154(b) by 2 days.

(21) Appl. No.: 13/834,435

(22) Filed: Mar. 15, 2013

(65) Prior Publication Data

US 2013/0201807 A1  Aug. 8, 2013

Related U.S. Application Data

(63) Continuation of application No. 12/532,211, filed as application No. PCT/IB2008/051015 on Mar. 18, 2008, now Pat. No. 8,422,349.

(30) Foreign Application Priority Data

Mar. 22, 2007  (EP) .................... 07104634

(51) Int. Cl.
*G11B 3/74* (2006.01)
*G11B 7/24* (2013.01)

(52) U.S. Cl.
USPC ...... 369/94; 369/53.37; 369/13.4; 369/47.39; 369/44.32; 369/53.13

(58) Field of Classification Search
USPC .......... 369/53.45, 53.37, 53.42, 53.22, 53.33, 369/53.12, 53.15, 47.44, 47.46, 47.14, 369/47.39, 44.32, 44.33, 30.36, 44.27, 30.3, 369/30.32, 30.21, 30.24, 13.07, 13.21, 369/47.53, 47.55, 13.26, 13.27, 13.35, 369/13.38, 13.39, 13.42

See application file for complete search history.

(56) References Cited

U.S. PATENT DOCUMENTS

| | | | |
|---|---|---|---|
| 6,574,174 B1 | 6/2003 | Amble et al. | |
| 7,274,626 B2 * | 9/2007 | Kawato et al. | 369/13.07 |
| 7,606,126 B2 * | 10/2009 | Nagano et al. | 369/47.53 |
| 2005/0002308 A1 | 1/2005 | Tanaka | |
| 2005/0195718 A1 * | 9/2005 | Fu et al. | 369/53.16 |
| 2005/0276577 A1 * | 12/2005 | Yoda et al. | 386/95 |

(Continued)

FOREIGN PATENT DOCUMENTS

| | | |
|---|---|---|
| JP | 2002298433 A | 10/2002 |
| JP | 2005038584 A | 2/2005 |

OTHER PUBLICATIONS

Written Opinion of the International Searching Authority for International Application No. PCT/IB2008/051015.

*Primary Examiner* — Wayne Young
*Assistant Examiner* — Dionne Pendleton

(57) ABSTRACT

A method comprising recording data related to a start-up procedure on at least one of a plurality of recording layers disposed on an optical record carrier for reading back the recorded data during subsequent start-ups, the selection of the at least one recording layer based on properties of the at least one recording layer is disclosed. The technique reduces the optical record carrier start-up time and is useful for DVD, HD-DVD and BD recorders and/or players.

18 Claims, 4 Drawing Sheets

(56) References Cited

U.S. PATENT DOCUMENTS

Figure 1:
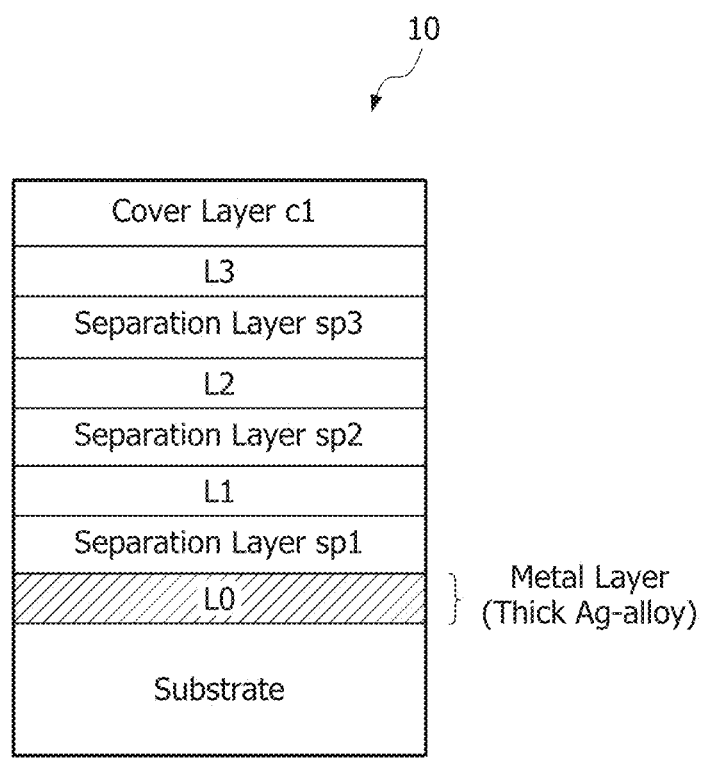

| | | |
|---|---|---|
| 2006/0187809 A1 | 8/2006 | Shoji et al. |
| 2007/0086294 A1 | 4/2007 | Ogawa et al. |
| 2007/0253306 A1* | 11/2007 | Takahashi et al. ............... 369/94 |
| 2010/0177610 A1* | 7/2010 | Matsuda .................... 369/53.17 |
| 2010/0329095 A1* | 12/2010 | Kuwahara et al. ......... 369/53.44 |

* cited by examiner

METHOD AND DEVICE TO IMPROVE START-UP PERFORMANCE OF A MULTI-LAYER OPTICAL DISC

The subject matter relates to a method for improving start-up performance of an optical disc and more specifically to a method for improving start-up performance of a multi-layer optical disc.

US patent 2005/0002308 discloses a recorder for recording data on a multi-layer optical recording medium. Loading of the multi-layer optical recording medium into the recorder (i.e. starting the optical recording medium to be ready for recording) usually can take on an average about 12 sec and can vary up to about 15 to 20 seconds. This can be quite annoying for the end user.

It would be advantageous to have a method that can improve start-up performance of a multi-layer record carrier. It would also be advantageous to have a drive that can improve start-up performance of a multi-layer record carrier.

A method comprising recording data related to a start-up procedure on at least one of a plurality of recording layers disposed on an optical record carrier for reading back the recorded data during subsequent start-ups, the selection of the at least one recording layer based on properties of the at least one recording layer is disclosed.

A drive comprising a control unit arranged to record data related to a start-up procedure on at least one of a plurality of recording layers disposed on an optical record carrier for reading back the recorded data during subsequent start-ups, the selection of the at least one recording layer based on properties of the at least one recording layer is disclosed.

Furthermore, the method of recording data related to the start-up procedure can be implemented with a computer program.

Figure 2:
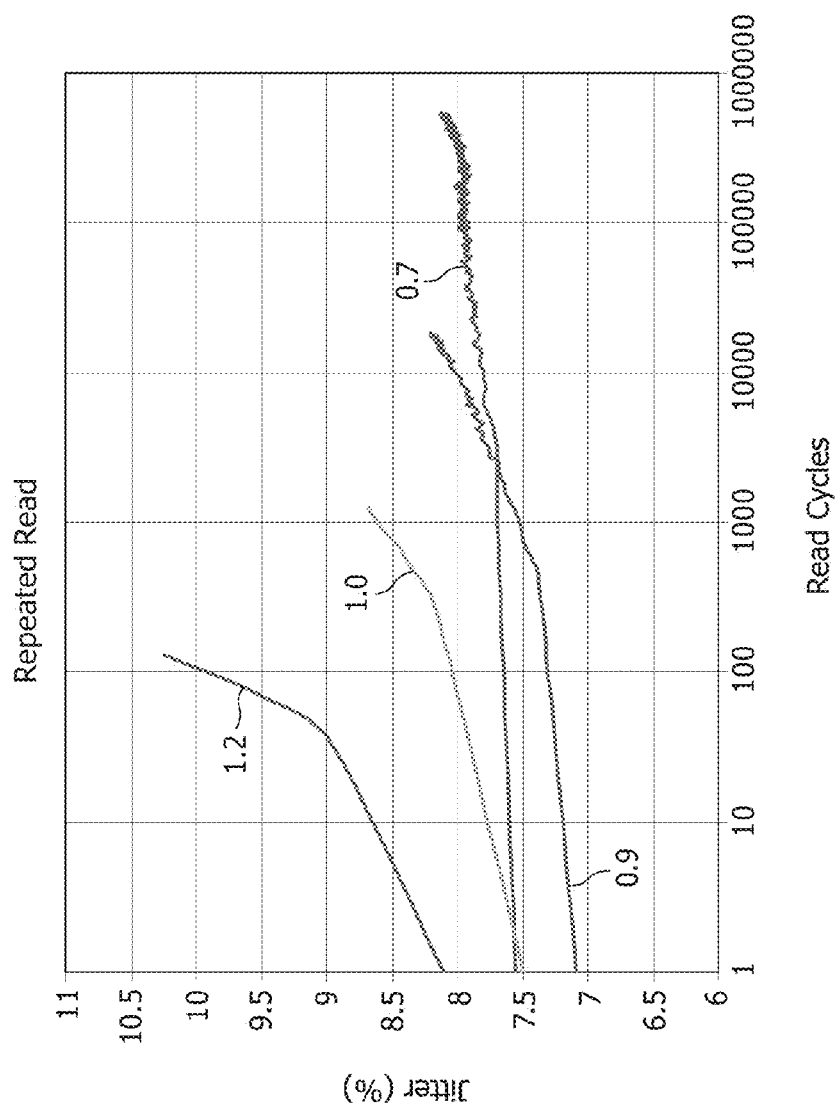
Figure 3:
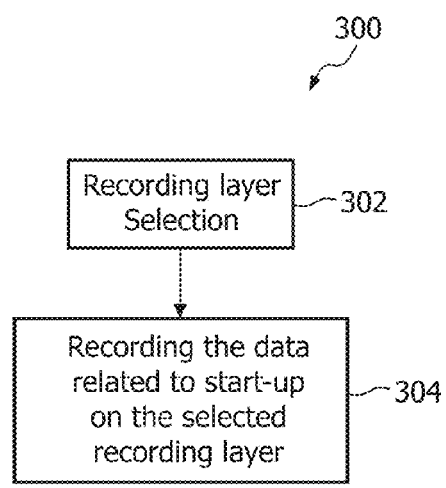
Figure 4:
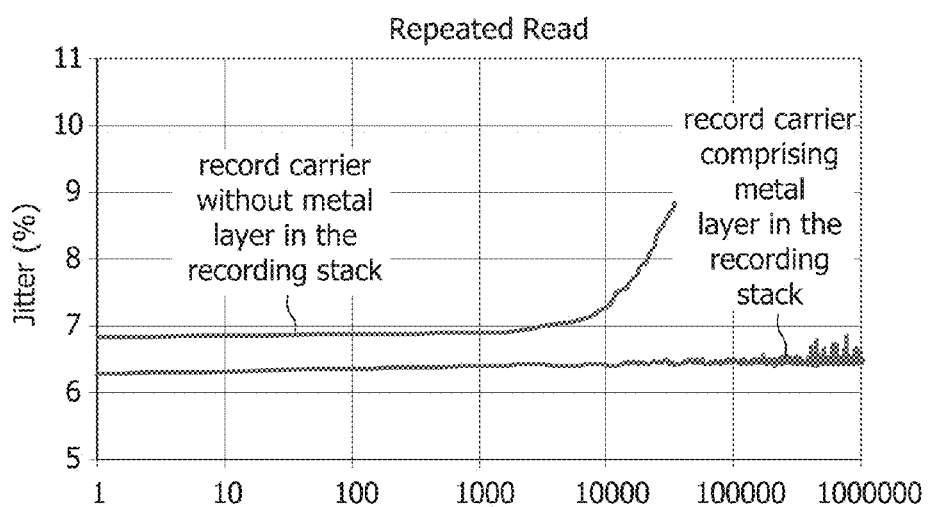
Figure 5:
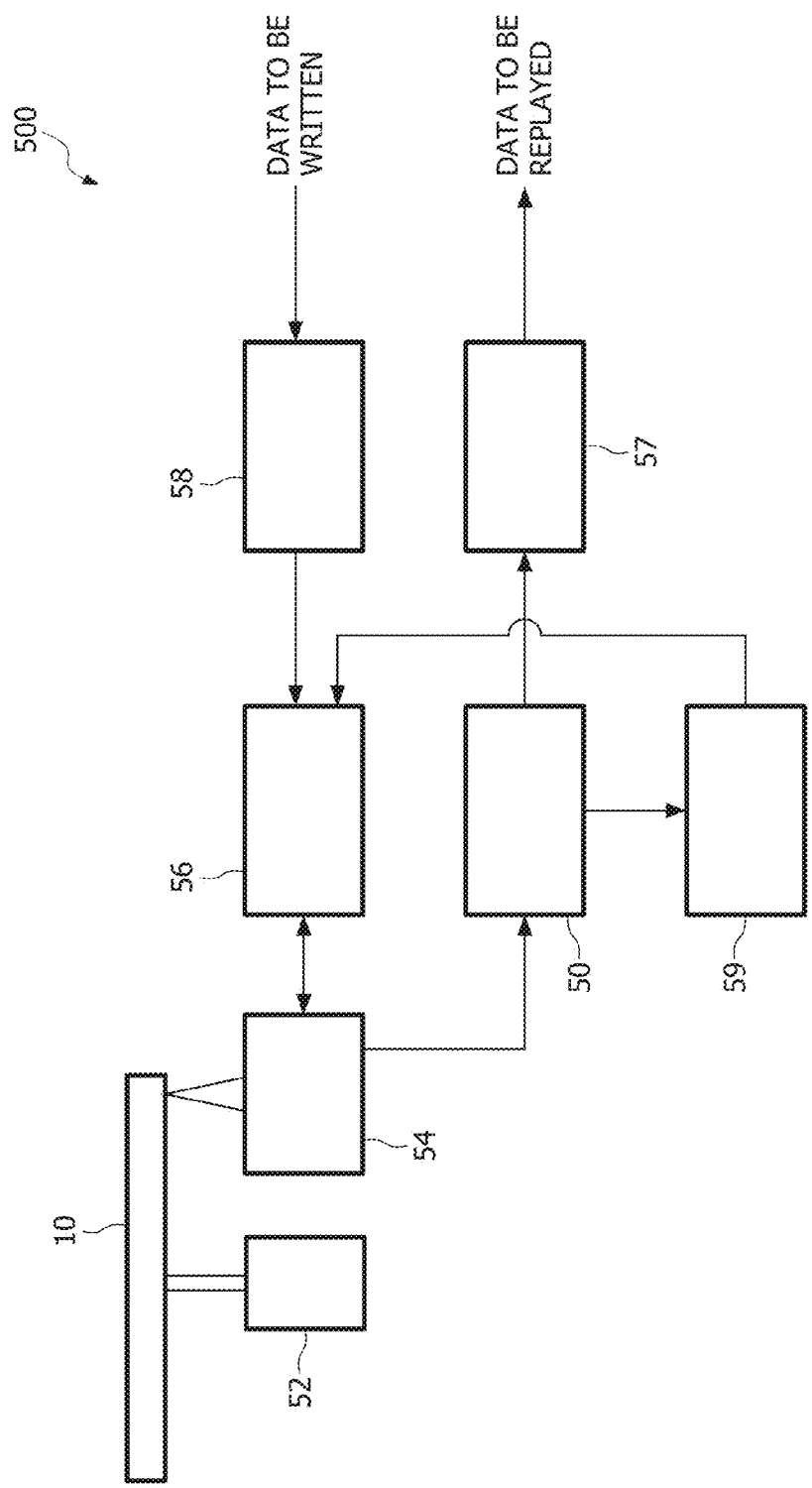

The above mentioned aspects, features and advantages will be further described, by way of example only, with reference to the accompanying drawings, in which the same reference numerals indicate identical or similar parts, and in which:

FIG. 1 shows an example of a schematic picture of an example four layer record carrier;

FIG. 2 schematically illustrates repeated read behavior of an example BD-R disc at read powers of 0.7 mW, 0.9 mW, 1.0 mW and 1.2 mW;

FIG. 3 shows an example of a flowchart illustrating detailed steps of the method according to the present subject matter;

FIG. 4 schematically illustrates repeated read behavior of a layer in a multi-layer record carrier comprising a metal layer in the recording stack and an example layer in a multi-layer record carrier without a metal layer in the recording stack; and FIG. 5 shows an example of a schematic block diagram of an exemplary drive used for recording/reading data from an example record carrier.

Referring to the example four layer optical record carrier 10 in FIG. 1, a plurality of recording layers L0, L1, L2 and L3 is formed above a first surface of a substrate. A plurality of separation layers sp1, sp2 and sp3 is disposed between the recording layers L0, L1, L2 and L3 respectively. A cover layer c1 is disposed above the top recording layer L3. It is to be noted that the optical record carrier 10 has recording layers, which typically each consist of a stack of material layers. The material layers in the optical record carrier 10 can be made of (for example) ZnS, SiO2, Cu, Si and Ag. The stack of the recording layer L1, L2 and L3 consist of material layers ZnS, SiO2, Cu and Si. The material layers generally have a thickness of approximately about 5-15 nm. There can be no thick metal layer in the top recording layer L3 because it needs to be transparent. The bottom recording layer L0 comprises a substantially thick metal layer (e.g. thick Ag-mirror approximately 100-150 nm thick). The thick metal layer can only be in the bottom recording layer L0 because the bottom layer doesn't have to be transparent. It is noted here that only for illustration purpose a four layer optical record carrier is shown and it is possible to have any number of layers (e.g. two layers, three layers, four layers, six layers, eight layers).

The transmission through the top recording layer(s) has to be very high in order to record and read-out all the recording layers. The higher the number of recording layers, the higher will be the transmission needed by the top recording layer. As an illustrative example the transmission of the individual recording layers that are required to reach an effective reflection of 4% from each layer (4% reflection is the minimum reflection from each layer in the current Blu-ray disc standard (System description Blu-ray disc recordable format, Part 1, Basic format specifications; System description Blu-ray disc rewritable format, Part 1, Basic format specifications)) are calculated. The results are shown in Table 1.

TABLE 1

| Calculated transmission through each single individual recording layer | | | |
|---|---|---|---|
| Recording layer | Reflection (individual layer), r | Transmission (individual layer), t | Effective Reflection, R |
| L3 | 4% | 82% | 4% |
| L2 | 6% | 74% | 4% |
| L1 | 11% | 63% | 4% |
| L0 | 27% | 0% | 4% |

The data in Table 1 are calculated using the following formulas $$R_0 = (t_3 \times t_2 \times t_1)^2 \times r_0$$

$$R_1 = (t_3 \times t_2)^2 \times r_1$$

$$R_2 = (t_3)^2 \times r_2$$

$$R_3 = r_3$$

where $t_n$ and $r_n$ are the transmission and reflection from the individual recording layers respectively; and $R_n$ is the effective reflectivity from the $n^{th}$ layer in the optical record carrier shown in FIG. 1.

It can be observed from Table 1 that the transmission of the top recording layers L3, L2, and L1 need to be very high, i.e. 60-80%. Reaching such high transmission excludes the use of any metal layer in the top stacks. Metal layers are often used as heat sinks to improve cooling of the recording stack. Therefore, unavoidably these upper layers will also have very poor cooling performance.

In most optical disc standards (e.g. System description Blu-ray disc recordable format, Part 1, Basic format specifications; System description Blu-ray disc rewritable format, Part 1, Basic format specifications) the "repeated read stability" is specified. It is often specified that one should be able to read-out the data 1.000.000 times at a certain minimum read power without degrading the recorded data.

Referring to FIG. 2, the vertical axis represents the Jitter (in %) and the horizontal axis represents the number of repeated read cycles. It can be seen that the higher the read power, the faster the jitter increases (data degrades). During repeated read the radiation source (e.g. laser) slowly heats up the disc, which causes degradation of the recorded data. The better the cooling properties of the recording stack, the more stable the recording stack is during repeated read. Read stability is directly linked to the cooling properties of the stack.

Reading out data from a disc at speeds higher than 1× (4.92 m/s for BD) normally also requires the read power to be increased (to improve signal-to-noise ratio). In practice this means that only discs with very good read stability can be read out at higher speeds.

A method comprising recording data related to a start-up procedure on at least one of a plurality of recording layers disposed on an optical record carrier for reading back the recorded data during subsequent start-ups, the selection of the at least one recording layer based on properties of the at least one recording layer is disclosed.

A successful start-up is a critical performance indicator of a disc player/recorder from the user's perspective. In a multi-layer optical record carrier, different layers will have different properties. Recording data related to the start-up procedure on a recording layer based on properties of the plurality of recording layers can improve start-up performance as the start-up related data can be recorded on the layer from which it can be accessed quickly. When the optical record carrier 10 loading in a recorder/player is fast, the user will have a higher satisfaction index of the recorder/player (as compared to slower optical record carrier loading time).

Referring to FIG. 3, in step 302, one of the recording layers (i.e. one of L0, L1, L2, and L3) is selected for recording the data related to the start-up procedure based on certain properties of the recording layers. In step 304, the data is recorded on the selected recording layer.

In an embodiment, in recording the data related to the start-up procedure, the property of the at least one recording layer is at least one of repeated-read stability of the recorded data and read-out speed. Referring to FIG. 4, the horizontal axis represents the number of repeated reads and the vertical axis represents the jitter %. Optical record carrier without the metal recording layer reaches about 10,000 read cycles before the jitter starts to increase, whereas the optical record carrier 10 (Cf. FIG. 1) with the metal recording layer is stable to over 1.000.000 read cycles. The thick metal layer (e.g. Ag-alloy) in the optical record carrier 10 improves cooling of the stack; consequently the repeated-read stability of the first recording layer L0 is very good. Hence, selecting an appropriate recording layer based on read-out speed and repeated read stability to record the start-up related data can improve start-up performance.

In a still further embodiment, in recording the data related to the start-up procedure, one of the plurality of recording layers L0, L1, L2, L3 is a first recording layer L0 (Cf. FIG. 1) disposed above a first surface of a substrate and wherein the first recording layer L0 is present adjacent to a substantially thick metal layer. It is further noted here that the first recording layer L0 is the bottom recording layer (i.e. recording layer that is farthest from the radiation beam source) as viewed from a recording/reading unit. Recording the data related to the start-up procedure on the first recording layer L0 is advantageous since the first recording layer is the layer that has good repeated-read stability and read-out speed. Furthermore, since the first recording layer happens to be the layer with very good read stability, the start-up data can be read-out at higher speeds and hence can improve the start-up performance. The first recording layer L0 has an added advantage that it offers higher data integrity.

In a still further embodiment, the data related to the start-up procedure is at least one of table of contents of the recorded data, information on a menu structure of the recorded data and an executable application. This is advantageous since the said data is typically required in many applications directly after start-up.

Further, the information on the menu structure of the recorded data comprises menu structure of a movie stored on the first recording layer L0 (Cf. FIG. 1). The streaming data (video and audio) is stored on the layers L1, L2, L3 (Cf. FIG. 1) since they can be played back at lower speeds (e.g. 1× speed).

Furthermore, the method includes recording the data related to the executable application on the first recording layer L0 (Cf. FIG. 1) and recording the remaining data associated with the executable application on the at least one of the plurality of recording layers L1, L2, L3 (Cf. FIG. 1) above the first recording layer L0. It is advantageous to record the executable application on the first recording layer L0, since it is read most often from the optical record carrier 10. The remaining data associated with the executable application such as database type data that are less frequently read-out (only when required by the executable application) from the optical record carrier 10 can be recorded on the recording layers L1, L2 and L3. The executable application can be a java (registered trademark) application. This is advantageous since java application may be executed by e.g. a BD drive directly after start-up.

In a still further embodiment, the optical record carrier is an optical recordable/re-writable record carrier such as DVD, Blu-ray disc and HD-DVD. The storage capacity of DVD's, Blu-ray discs and HD-DVD's is increasing and four layer/six layer Blu-ray discs are expected to come to the market. Hence, it would be advantageous to have a method that can access quickly the start-up related data and that can improve the start-up performance of such discs.

Referring to FIG. 5, the optical record carrier 10 (Cf. FIG. 1) is constant angular velocity (CAV) controlled or constant linear velocity (CLV) controlled by a spindle motor 52. An optical pick-up unit 54 records data on the optical record carrier 10 by using laser light (at a recording power value) emitted form a laser diode. When the data is to be recorded, it is supplied to an encoder unit 58 and the data encoded by the encoder unit 58 is supplied to a laser diode-driving unit 56. The laser diode-driving unit 56 generates a drive signal based on the encoded data and supplies the drive signal to the laser diode of the optical pick-up unit 54. In addition, a control signal from a control unit 54 is supplied to the laser diode-driving unit 56 so that the recording strategy and recording power are determined by the control signal. However, when the data is read from the optical record carrier 10, the laser diode of the optical pick-up unit 54 emits laser light of a read power (read power<record power), and the reflected light is received. The received reflected light is converted into an electrical signal and a read RF signal is obtained. The read RF signal is supplied to an RF signal-processing unit 50.

The RF signal-processing unit 50 comprises an equalizer, a binarizing unit, a phase-locked loop (PLL) unit, and binarizes the read RF signal, generates a synchronous clock, and supplies these signals to a decoder unit 57. The decoder unit 57 decodes data based on these supplied signals and outputs the decoded data as read data. The drive 500 also includes a circuit (for data read-out) for controlling the focus servo or tracking servo by producing a tracking error signal or a focus error signal respectively, and a wobble signal formed on the optical record carrier 10 (e.g. for use in address demodulation or for controlling the number of rotations). The servo control structures are identical to those in conventional drive systems and therefore are not described in detail.

The construction shown in FIG. 5 only illustrates portions related to the general operation of the drive 500. The description and detailed explanation of servo circuits for controlling the optical pick-up unit, the spindle motor, the slide motor, and the control circuits are omitted, because they are constructed in a similar manner as in conventional systems.

The control unit 59 is arranged to record data related to a start-up procedure on at least one of a plurality of recording layers disposed on an optical record carrier for reading back the recorded data during subsequent start-ups, the selection of the at least one recording layer based on properties of the at least one recording layer.

In an embodiment, in recording the data related to start-up procedure, the control unit is arranged to select the property of the at least one recording layer from at least one of:
repeated-read stability of the recorded data; and
read-out speed.

In a further embodiment, the control unit 59 (Cf. FIG. 5) is arranged to record the data on the first recording layer L0 (Cf. FIG. 1) disposed above a first surface of a substrate wherein the first recording layer L0 is present adjacent to a substantially thick metal layer.

The drive 500 can be an optical drive such as DVD drive, Blu-ray disc drive and HD-DVD drive. Furthermore, a recorder or player (e.g. DVD recorder and/or player, Blu-ray disc recorder and/or player) having the drive 500 can reduce the time taken by the drive 500 to load the optical record carrier 10 into the drive 500 (i.e. to be ready for recording/reading).

Although the present subject matter has been explained by means of embodiments using multi-layer Blu-ray discs, the subject matter is applicable to all types of optical record carriers (HD-DVD, DVD, and CD). It is not limited to a two-layer one side disc, i.e., a dual layer disc, and to a two-layer double side disc, i.e. a dual layer double-sided disc. A person skilled in the art can implement the described embodiments of the method in software or in both hardware and software. Other variations to the disclosed embodiments can be understood and effected by those skilled in the art of practicing the claimed subject matter, from a study of the drawings, the disclosure and the appended claims. The use of the verb "comprise" does not exclude the presence of elements other than those listed in a claim or in the description. The use of the indefinite article "a" or "an" preceding an element does not exclude the presence of a plurality of such elements. The Figures and description are to be regarded as illustrative only and do not limit the subject matter.

The invention claimed is:

1. A method for recording data related to a start-up procedure on at least one of a plurality of recording layers disposed on an optical record carrier, the method comprising:
selecting at least one recording layer based on one or more properties of the at least one recording layer, the properties of the at least one recording layer on which the selection is based including at least the repeated-read stability of recorded data as defined by a measurement of the repeated-read stability of recorded data; and
recording the data related to the start-up procedure on the selected at least one recording layer for reading back the recorded data during subsequent start-ups.

2. The method of claim 1, wherein said measured repeated read-stability comprises an ability to read data from the optical record carrier for a predetermined number of cycles at a predetermined read power.

3. The method of claim 1, wherein the properties of the at least one recording layer on which the selection is based includes the read-out speed of the recorded data.

4. The method of claim 1, wherein one of the plurality of the recording layers is a first recording layer disposed above a first surface of a substrate and wherein the first recording layer is present adjacent to a substantially thick metal layer.

5. The method of claim 1, wherein the data related to the start-up procedure is at least one of:
table of contents of the recorded data;
information on a menu structure of the recorded data; and
an executable application.

6. A method for recording data related to a start-up procedure on at least one of a plurality of recording layers disposed on an optical record carrier, the method comprising:
selecting at least one recording layer based on one or more properties of the at least one recording layer, the properties of the at least one recording layer on which the selection is based including at least one of measurement of the read stability and measurement of the read out speed of recorded data; and
recording the data related to the start-up procedure on the selected at least one recording layer for reading back the recorded data during subsequent start-ups.

7. The method of claim 6, wherein one of the plurality of the recording layers is a first recording layer disposed above a first surface of a substrate and wherein the first recording layer is present adjacent to a substantially thick metal layer.

8. The method of claim 6, wherein the data related to the start-up procedure is at least one of:
table of contents of the recorded data;
information on a menu structure of the recorded data; and
an executable application.

9. A drive for recording data related to a start-up procedure on at least one of a plurality of recording layers disposed on an optical record carrier, the drive comprising a control unit configured to:
select at least one recording layer based on one or more properties of the at least one recording layer, the properties of the at least one recording layer on which the selection is based including at least the repeated-read stability of the recorded data as defined by a measurement of the repeated-read stability of recorded data, and
record the data related to the start-up procedure on the selected at least one recording layer for reading back the recorded data during subsequent start-ups.

10. The drive of claim 9, wherein the repeated read-stability comprises an ability to read data from the optical record carrier for a predetermined number of cycles at a predetermined read power.

11. The drive of claim 9, wherein the properties of the at least one recording layer on which the selection is based includes the read-out speed of the recorded data.

12. The drive of claim 9, wherein the control unit is configured to record the data on the first recording layer disposed above a first surface of a substrate and wherein the first recording layer is present adjacent to a substantially thick metal layer.

13. The drive of claim 9, wherein the control unit is configured to select the data related to the start-up procedure from at least one of:
table of contents of the recorded data;
information on a menu structure of the recorded data; and
an executable application.

14. A drive for recording data related to a start-up procedure on at least one of a plurality of recording layers disposed on an optical record carrier, the drive comprising a control unit configured to:
select at least one recording layer based on one or more properties of the at least one recording layer, the properties of the at least one recording layer on which the selection is based including at least the read out speed of the recorded data as defined by a measurement of the read out speed of recorded data; and record the data related to the start-up procedure on the selected at least one recording layer for reading back the recorded data during subsequent start-ups.

15. The drive of claim 14, wherein the control unit is configured to record the data on the first recording layer disposed above a first surface of a substrate and wherein the first recording layer is present adjacent to a substantially thick metal layer.

16. The drive of claim 14, wherein the control unit is configured to select the data related to the start-up procedure from at least one of:

table of contents of the recorded data;

information on a menu structure of the recorded data; and an executable application.

17. A non-transitory computer readable media comprising a computer program code configured to interact with a control unit of a drive for recording data on an optical record carrier, to perform a method for recording data related to a start-up procedure on at least one of a plurality of recording layers disposed on the optical record carrier, the method comprising:

selecting at least one recording layer based on one or more properties of the at least one recording layer, the properties of the at least one recording layer on which the selection is based including at least the repeated-read stability of recorded data as defined by a measurement of the repeated-read stability of recorded data; and recording the data related to the start-up procedure on the selected at least one recording layer for reading back the recorded data during subsequent start-ups.

18. A non-transitory computer readable media comprising a computer program code configured to interact with a control unit of a drive for recording data on an optical record carrier, to perform a method for recording data related to a start-up procedure on at least one of a plurality of recording layers disposed on the optical record carrier, the method comprising:

selecting at least one recording layer based on one or more properties of the at least one recording layer, the properties of the at least one recording layer on which the selection is based including at least the read out speed of recorded data as defined by a measurement of the read out speed of recorded data; and recording the data related to the start-up procedure on the selected at least one recording layer for reading back the recorded data during subsequent start-ups.

* * * * *